United States Patent Office 3,235,498
Patented Feb. 15, 1966

3,235,498
FOAM-INHIBITED OIL COMPOSITIONS
Hans F. Waldmann, Glassboro, N.J., assignor to Socony Mobil Oil Company, Inc., a corporation of New York
No Drawing. Filed June 11, 1962, Ser. No. 201,309
5 Claims. (Cl. 252—49.6)

This invention relates to the inhibition of foam in oil compositions containing materials which normally tend to promote foaming of the composition. More particularly, the invention relates to such oil compositions to which have been added silicone polymers and special inhibitors.

In the preparation of oil compositions for use as hydraulic fluids, as lubricants and the like, various additives are used to prevent sludging, deposition of gum and resinous materials, or similar objectionable results. These additives are generally in the nature of detergents which are effective for the intended purposes but, characteristically, increases the foaming tendencies of the oil composition. To overcome this problem, silicone polymers have been employed in the prior art with some degree of success. Unfortunately, however, the silicones which do initially supress foaming, lose their effectiveness in a relatively short period of time. Many materials have been suggested for prolonging the foam-inhibiting action to the silicones with generally indifferent success.

According to the present invention, it has now been found that oil compositions containing detergent additives which promote foaming and silicone polymer antifoamants may be kept substantially foam-free by incorporating into the compositions, a small amount of a partial fatty (acid) ester of a polyhydric alcohol. The partial esters of the invention, which are referred to hereinafter as inhibitors, are prepared by the partial esterification of an aliphatic alcohol having from 2 to 6 carbon atoms and containing from 2 to 6 hydroxyl groups with a fatty acid having from 5 to about 25 carbon atoms, including the carboxyl carbon. Thus, the partial esters may be prepared from polyhydric alcohols, such as glycol, glycerol, erythritol, pentaerythritol, the various isomeric pentitols and hexitols, such as arabitol, adonitol, mannitol, sorbitol, etc. Inner anhydrides of the polyhydric alcohols, such as sorbitan

are also highly suitable in the invention. The fatty acid used to prepare the partial esters are, of course, well known, any of these acids having from about 5 to about 25 carbon atoms, such as valeric, caprylic, capric, lauric, myristic, palmitic, stearic, oleic, linoleic, linolinic and hyenic acids, being suitable.

Due to the variety of the partial esters suitable for use in the invention a classification thereof by means of a generic chemical formula is not feasible. The esters are, therefore, broadly defined herein in terms of the polyhydric alcohols and acids from which they are prepared. Since the nature of the contemplated esters and their manner of preparation are well known to the art, it is considered that this is the most feasible and readily understandable manner of defining them.

As typical examples of the partial esters contemplated by the invention there may be mentioned the following:

Glycol monovalerate
Glycol monolaurate
Glycol monostearate
Glycol monooleate
Glycerol monocaprylate
Glycerol dilaurate
Glycerol monooleate
Glycerol distearate
Glycerol monolinoleate
Adonitol trioleate
Mannitol tristearate
Sorbitol dilaurate
Sorbitol tricaproate
Sorbitan monolaurate
Sorbitan monooleate
Sorbitan monostearate
Sorbitan tristearate As is well known, one class of detergent additives commonly used in lubricating oil compositions are oil-soluble metal salts of high molecular weight (300–1000) sulfonic acids, such as petroleum-derived sulfonic acids and synthetic alkyl-aryl sulfonic acids having from about 8 to about 24 carbon atoms in the alkyl portion thereof, the alkaline earth metal salts being specifically preferred. As specific examples of such salts there may be mentioned normal and basic calcium and barium petroleum sulfonates and normal and basic, or complex) calcium and barium salts of octyl-, nonyl- and wax-substituted benzene sulfonates.

Another preferred class of detergents are the metal salts of alkyl phenol sulfides, such as for example, the normal or basic (complex) barium and calcium salts of amyl- and nonyl-substituted phenol sulfide. Such salts are fully described in the prior art. See, for example, U.S. Patents Nos. 2,451,345, 2,362,289, and 2,916,454.

Metal salts of phosphorus sulfide-hydrocarbon reaction products, particularly the alkaline earth metal salts are also well known oil detergents, especially the barium salts. Specific salts of this character are the $P_2S_5$-polyolefin type salts, such as the barium salts of $P_2S_5$-polypropylene reaction products. Salts of this type are fully described, for example, in U.S. Patents Nos. 2,316,080, 2,316,082, 2,316,088, and 2,806,022.

While the foregoing classes of detergent additives have been mentioned as illustrative, it will be appreciated that the principle of the present invention may be successfully applied to any oil composition containing one or more detergents, which increase the foaming tendencies thereof. Also, oil compositions containing additional additives along with the foam-inducing additives, such as conventional antioxidants, pour point depressants, extreme pressure agents and the like may be improved (with respect to their foaming tendencies) by the invention.

The silicone polymers are compounds well known in the art. The dimethyl silicones which are the ones most commonly employed vary widely in molecular weight depending on the length of the polymer chain and are generally characterized by their viscosities as determined at 25° C. These silicones have the general formula:

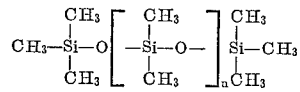

where $n$ is a number having an average value such that the silicone polymer has a viscosity at 25° C. of from about 3.0 to about 1,000,000 cs. and preferably from about 300 to about 100,000 cs. Similar polymers having longer alkyl groups and/or aryl groups are also suitable for the invention.

A full understanding of the invention will be had from the following examples in which all of the percentages given are by weight.

*Examples*

A series of foaming tests was conducted using an oil composition composed of 95.35% of an SAE–50 grade lubricating oil and 4.65% of typical commerial detergent additives as follows: (1) 2% of an oil concentrate (10% Ba) of a complex carbonated barium nonylphenol sulfide; (2) 0.9% of an oil concentrate (9.5% Ba) of a mixture of sulfurized barium alkylphenate and phosphosulfurized polybutene barium salt; (3) 1.0% of an oil concentrate (10% Ba) of a basic barium wax-benzene sulfonate; and (4) 0.75% of an oil concentrate (8% Zn) of zinc dihexyl dithiophosphate. This oil composition (Oil A) was blended with a typical dimethyl silicone polymer alone and with the same silicon polymer and various inhibitors typical of the invention. These compositions and also the SAE-50 grade base oil alone (no additives) and a blend of the base oil with the dimethyl silicone were then tested for foam tendency (cc. of foam after 5 minutes aeration) and foam stability (cc. of foam after 10 minutes standing), according to Sequence 1 of ASTM foam test, D-892-46T. The tests were carried out one day after preparation of the various blend (i.e., Oil A plus either silicone or silicone and inhibitor) and were repeated after 14 days and after 75 days. The results of the tests are summarized in Table I in which "FT" stands for foaming tendency and "FS" stands for foam stability.

TABLE I

| Inhibitor | Percent Inhibitor Added | Silicone Polymer[1] (p.p.m.) | FT/FS (cm.³) | | |
|---|---|---|---|---|---|
| | | | After 1 Day | After 14 Days | After 75 Days |
| Oil A | None | 2 | 660/610 | 670/610 | |
| Glycerol Monostearate | 0.3 | 2 | 5/0 | 25/0 | 60/0 |
| Do | 0.3 | 2 | 100/0 | 280/0 | 300/0 |
| Sorbitan Monooleate | 0.1 | 2 | 5/0 | 530/60 | 350/0 |
| Do | 0.3 | 2 | 0/0 | 200/0 | 220/0 |
| Do | 0.5 | 2 | 0/0 | 0/0 | 20/0 |
| Sorbitan Monolaurate | 0.3 | 2 | 0/0 | 60/0 | 210/0 |
| Sorbitan Monostearate | 0.3 | 2 | 0/0 | 70/0 | 270/0 |
| Sorbitan Tristearate | 0.3 | 2 | 0/0 | 400/0 | 390/0 |

[1] Dow-Corning Fluid 200, 60,000 cs. @ 25° C.

A second series of foaming tests was conducted after the fashion of the preceding series employing an oil composition prepared with the 50-SAE grade base oil used in Oil A and containing three of the additives used in Oil A in the following amounts based on the total composition: 1.5% Additive (1), 1.5% Additive (3) and 0.5% Additive (4). In these tests the 50-SAE grade base oil without additives, the compounded oil (Oil B) and the compounded oil having added thereto varying amounts of the same silicone polymer used in the first test series were tested with the results shown in Table II. The tests were conducted one day after the blends (Oil B plus the silicone) were prepared.

TABLE II

| | Silicone Added p.p.m. | Foam, FT/FS (cm.³) |
|---|---|---|
| Base Oil (No Additives) | None | 400/10 |
| Do | 1.5 | 0/0 |
| Oil B | None | 670/630 |
| Do | 1.5 | 600/500 |
| Do | 3.0 | 540/400 |
| Do | 4.5 | 530/330 |
| Do | 10.0 | 650/480 |

These test results clearly show that although the silicone polymer is an effective foam-inhibitor in the uncompounded oil it is practically ineffective as a foam inhibitor in the compounded oil, even when employed in relatively large amounts.

Portions of Oil B were then mixed with 1.5 p.p.m. of the same silicone polymer and to the mixture was added small amounts of the inhibitors of the invention and these compositions tested for foaming after storage. The results are shown in Table III.

TABLE III

| Inhibitor | Percent Inhibitor Added | Silicone Polymer[1] (p.p.m.) | FT/FS (cm.³) | | |
|---|---|---|---|---|---|
| | | | After 1 Day | After 14 Day | After 75 Days |
| Oil B | None | 1.5 | 660/610 | 670/620 | |
| Glycerol Monooleate | 0.3 | 1.5 | 0/0 | 0/0 | 10/0 |
| Sorbitan Monooleate | 0.3 | 0.5 | 10/0 | 90/0 | 170/0 |

[1] Dow-Corning Fluid 200, 60,000 cs. @ 25° C.

It will be apparent from the foregoing examples and tests that the inhibitors of the present invention act to prevent any substantial foaming and such foam as may be formed initially is merely transient and disappears substantially completely before expiration of the 10-minute standing period called for by the standard test. It is considered especially significant that these inhibitors continue to act as foam inhibitors even after as much as 75 days. A further feature of this invention lies in the fact that the inhibitors are effective with even very small amounts of the silicone.

From the standpoint of economy, it is, of course, desirable that the amount of inhibitor as well as the amount of silicone polymer added to the oil composition be kept to a minimum. It has been found that as little as 1-2 parts per million of silicone is effective with as little as 0.01% of inhibitor. The amounts of silicone and inhibitors used, however, will depend on the nature and/or amount of the detergent additives present in the oil composition. Generally, the detergent additives are employed in various oil compositions in amounts ranging from about 0.5% to about 30%, usually from 1% to about 5%. As a rule, the amount of silicone polymer will be between about 0.5 and about 10.0 parts per million, while the amount of inhibitor used will be between 0.01% and 1.0%, and preferably between about 0.03% and about 0.3%. Obviously, amounts of silicone and/or inhibitor substantially greater than these relatively small amounts can be employed without lessening of the anti-foaming benefits of the invention. Accordingly, it will be understood that the use of such higher amounts is within the spirit and scope of the invention.

It is pointed out that all of the percentage amounts stated hereinabove and in the appended claims are on a weight basis.

Although the invention has been described herein in terms of specific embodiments and examples thereof, it is not intended that the scope thereof be limited in any way thereby, but only as indicated in the following claims.

What is claimed is:

1. A foam-inhibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 cs. to about 1,000,000 cs. and (b) a minor amount, from about 0.01% to about 1%, of a partial ester formed from an aliphatic polyhydroxy alcohol having from 2 to about 6 carbon atoms and from 2 to about 6 hydroxyl groups and a fatty acid having about 18 carbon atoms.

2. The composition of claim 1 in which the partial ester is glycerol monostearate.

3. The composition of claim 1 in which the partial ester is sorbitan monooleate.

4. The composition of claim 1 in which the partial ester is sorbitan monostearate.

5. A foam-inhibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 cs. to about 1,000,000 cs. and (b) a minor amount, from about 0.01% of glycerol monooleate.

References Cited by the Examiner

UNITED STATES PATENTS

| | | | |
|---|---|---|---|
| 2,085,709 | 6/1937 | Steibeet | 252—9.23 |
| 2,595,928 | 5/1952 | Currie et al. | 252—358 |
| 2,715,613 | 8/1955 | Gibson | 252—321 |
| 2,843,551 | 7/1958 | Leonard et al. | 252—321 X |
| 2,972,579 | 2/1961 | Delfel | 252—358 X |

OTHER REFERENCES

McBain et al., "Foaming of Aircraft-Engine Oils as a Problem in Colloid Chemistry—I," in Wartime Report, NACA ARR No. 4105, National Advisory Committee for Aeronautics, September 1944, page 73 relied on.

Ross, "Chemical Antifoaming Agents," Chemical Industries, May 1949, 757–759.

DANIEL E. WYMAN, *Primary Examiner.*

JULIUS GREENWALD, *Examiner.*